United States Patent [19]

Antonini et al.

[11] 3,883,605

[45] May 13, 1975

[54] PREPARATION OF 1,2-DICHLOROETHANE AND 1,1,2,2-TETRACHLOROETHANE BY OXYCHLORINATION

[75] Inventors: Albert Antonini, Paris; Claude Kaziz, La Courneuve; Georges Wetroff, Le Thillay, all of France

[73] Assignee: Produits Chimiques, Pechiney-Saint-Gobain, France

[22] Filed: May 20, 1968

[21] Appl. No.: 730,608

[30] Foreign Application Priority Data

May 19, 1967 France .............................. 67.106976

[52] U.S. Cl. ....................... 260/658 R; 260/659 A
[51] Int. Cl. ............................................. C07c 17/00
[58] Field of Search .................... 260/658 R, 659 A

[56] References Cited
UNITED STATES PATENTS

| 2,866,830 | 12/1958 | Dunn et al. ............... 260/659 A X |
|---|---|---|
| 3,010,913 | 11/1961 | Price ......................... 260/659 A X |
| 3,420,901 | 1/1969 | Schulz ......................... 260/659 A |
| 3,427,359 | 2/1969 | Rectenwald et al. .......... 260/659 A |
| 3,461,084 | 8/1969 | Li ............................... 260/659 A X |
| 3,468,968 | 9/1969 | Baker et al. .................. 260/659 A |

FOREIGN PATENTS OR APPLICATIONS

| 451,379 | 9/1948 | Canada ......................... 260/659 A |
| 992,847 | 5/1965 | United Kingdom ............. 260/659 A |

OTHER PUBLICATIONS

Mantell, Adsorption, TP156,A35M3, 1951, C.6.

*Primary Examiner*—Delbert E. Gantz
*Assistant Examiner*—Joseph A. Boska

[57] ABSTRACT

Process for simultaneous preparation of 1,2-dichloroethane and 1,1,2,2-tetrachloroethane by oxychlorination of ethylene and dichloroethylenes with a fluid bed catalyst.

15 Claims, No Drawings

PREPARATION OF 1,2-DICHLOROETHANE AND 1,1,2,2-TETRACHLOROETHANE BY OXYCHLORINATION

This invention relates to a process for the simultaneous preparation of 1,2-dichloroethane and 1,1,2,2-tetrachloroethane by oxychlorination of a mixture of ethylene and dichloroethylenes.

It is well known that oxychlorination of ethylene, in the presence of an appropriate catalyst, will yield 1,2-dichloroethane. It is also known that the oxychlorination reaction can be adapted to provide other chlorinated compounds of ethane and of ethylene, such as dichloroethylenes, 1,1,2-trichloroethane and 1,1,2,2-tetrachloroethane. The processes of the prior art are not able to produce significant quantites of 1,1,2,2-tetrachloroethane in addition to 1,2-dichloroethane without simultaneous side reactions, such as combustion, partial oxidation of ethylene and/or dehydrochlorination reactions leading to $C_2$ unsaturated chlorinated compounds.

The catalysts usually used for the oxychlorination of ethylene give rise to a reaction which yields essentially 1,2-dichloroethane.

It is also known that the oxychlorination of dichloroethylenes yields essentially 1,1,2,2-tetrachloroethane. However, this reaction is subject to several difficulties, namely: the amount of chlorinated ethylenic by-products is substantial, such as up to 9 mole per cent, the amount of 1,1,2,2-tetrachloroethane increases with the increase in residence time of the dichloroethylenes in the reactor and, consequently, an important total conversion rate of dichloroethylenes to 1,1,2,2-tetrachloroethane can be obtained only at the expense of the productivity of such a process.

The major difficulty resides in the inability to limit the formation of ethylenic chlorinated derivatives, especially trichloroethylene and perchloroethylene. In effect, it is known that in the presence of heat 1,1,2,2-tetrachloroethane is transformed by dehydrochlorination to trichloroethylene, and pentachloroethane is transformed to perchloroethylene in the presence of metal chlorides and/or oxychlorides based catalysts, particularly copper chlorides and/or oxychlorides.

Applicants have found that when the oxychlorination is carried out with a mixture of ethylene and dichloroethylenes, the formation of 1,2-dichloroethane and 1,1,2,2-tetrachloroethane is achieved without appreciable dehydrochlorination leading to chlorinated ethylenic derivatives, such as trichloroethylene and perchloroethylene or reactions of combustion.

The principal object of this invention is to obtain essentially $C_2$ saturated chlorinated derivatives while limiting the proportion of $C_2$ ethylenic chlorinated derivatives to less than 2 molar per cent and the combustion products to less than 1 molar per cent respectively, when calculated on the mixture of ethylene and dichloroethylenes involved in the feed.

Applicants have established that ethylene in the reaction mixture and/or its transformation products enter into competition with cis-dichloroethylene and/or trans-dichloroethylene(1,2-dichloro-ethylene in the reaction which takes place at the catalyst level, leading to the unexpected result of decreasing the formation of undesirable ethylenic chlorinated derivatives and limit the combustion reaction to a rate lower than that which is observed under the same conditions with ethylene alone as a reactant.

The invention has for an object a new and improved combination of means which makes use of a fluidized bed catalyst with a well defined reaction temperature zone and predetermined feed ratios of reactants, particularly the ratio of oxygen to ethylene and dichloroethylene. This invention relates also to a new catalytic system adapted for use in the oxychlorination of a mixture of ethylene and dichloroethylenes.

In accordance with the practice of this invention, gaseous hydrochloric acid, a molecular oxygen containing gas, ethylene and dichloroethylenes, with the latter present in the ratio of at least 40 molar % to 95 molar % ethylene, is passed at a temperature within the range of 200° to 360° C and preferably 280° to 350° C through a catalytic reaction zone in which the catalyst is present in a fluidized state. The mixture of ehtylene and dichloroethylenes is transformed into a mixture of chlorinated derivatives of ethane composed essentially of 1,2-dichloroethane and 1,1,2,2-tetrachloroethane in various proportions.

The feed flow rate of the mixture of ethylene and cis- and trans-(1,2-dichloroethylene) in the reaction zone should be limited to within the range of 0.5 to 20 moles per hour per liter of catalyst and preferably less than 9 moles per hour per liter of catalyst to achieve the desired results. The reactants are fed in the feed molar ratio of $HCl/(C_2H_4 + CHCl = CHCl)$ within the range of 1.6 to 2.4 and preferably within the range of 1.8 to 2.2; $O_2/(C_2H_4 + CHCl = CHCl)$ within the range of 0.40 to 0.70 and preferably within the range of 0.5 to 0.6. The molar feed ratio of $CHCl = CHCl/(C_2H_4 + CHCl = CHCl)$ is preferably maintained within the ratio of 0.05 to 0.6.

In accordance with a particular embodiment of the invention, 1,2-dichloroethane and/or 1,1,2,2-tetrachloroethane is added for introduction with the described reactants in the feed. when employed, such 1,2-dichloroethane and/or 1,1,2,2-tetrachloroethane is added in a molar ratio of less than 2 with respect to the amount of the reactants ethylene and dichloroethylene.

The catalyst which can be used for carrying out the process of this invention is in the form of a catalytic agent deposited on a carrier formed of particles having a size within the range of 10 to 900 microns and an average specific surface area above 1 $m^2/g$ and preferably above 10 $m^2/g$. The average particle size of the carrier should be within the range of 20 to 400 microns and preferably 40 to 120 microns.

The term "average specific surface area" is used due to the fact that if a series of catalyst samples are taken from various points of the catalytic bed in order to determine the specific surface area of the carrier according to the B.E.T. method, the results show a dispersion. However, the extreme values will not deviate by more than 25% of the average.

As the carrier for the catalytic agent, use can be mde of one or more substances selected from the group comprising alumina, magnesia, graphite, activated carbon, aluminosilicates and preferably silica and clays having the aforementioned characteristics. Good results are obtained with an attapulgite type clay which presents an average specific surface area within the range of 10 to 160 $m^2/g$. Very good results are obtained with a carrier consisting essentially of silica and magnesia having an average specific surface area within the range of 40 to 200 m²/g and which has excellent characteristics from the standpoint of fluidization.

As the catalytic agent, use can be made of at least one compound of the following list of elements: alkali metals, alkaline earth metals, bismuth, cadmium, chromium, cobalt, copper, tin, iron, magnesium, manganese, nickel, platinum, rare earths, thorium, vanadium, zinc and zirconium.

The oxychlorination reaction is preferably carried out under a pressure within the range of 1 to 10 absolute bars and preferably within the range of 2 to 8 absolute bars. Pressures higher than 10 bars can be used, the apparatus permitting, but no marked advantage is derived from the use of such higher pressures.

The following examples are given by way of illustration, but not by way of limitation, of the practice of this invention:

EXAMPLES I to III

The oxychlorination reaction of a mixture of ethylene and cis- and trans-dichloroethylenes is carried out in a glass reactor having an internal diameter of 65 mm and a height of 1000 mm, and provided for external heating by electrical resistance heaters. The lower portion of the reactor tube is provided with a reversed cone filled with 2 mm glass beads for mixing the reactants and to diffuse the gases in the catalytic bed. The height of the catalytic bed, at rest after fluidization, is 450 mm. The catalyst is prepared by impregnating an attapulgite type clay with an aqueous solution of $CuCl_2 \cdot 2H_2O$ and KCl in amount to provide a final content of copper and potassium cations of 8.7 and 4.9% by weight respectively.

The average specific surface area of the carrier, measured after the catalyst has been operating under normal running conditions for a hundred hours, is about 80 m²/g. The catalytic mass presents a granular size ranging from 100 to 315 microns of which 50% have a granular size below 210 microns.

During the operation the reactants ethylene, cis- and trans-dichloroethylenes, air and hydrochloric acid are introduced under an absolute pressure of 1.05 bar at the lower part of the reversed cone and the reactor is heated by the external electrical resistance heaters to maintain the temperature of the catalytic zone at 325° C ± 2° C.

The results vary according to the composition of the mixture introduced into the reactor, as set forth in the following Table I. The table also shows a characteristic ratio which is significant of the selectivity of this process.

$$S = 100 \; \frac{\text{moles of } (CH_2Cl\text{-}CH_2Cl + CHCl_2\text{-}CHCl_2) \text{ obtained}}{\text{moles of } (C_2H_4 + \text{cis } CHCl=CHCl + \text{trans}CHCl=CHCl) \text{ transformed}}$$

TABLE I

| Example | | 1 | 2 | 3 |
|---|---|---|---|---|
| Feed flow rate of the mixture ($C_2H_4+C_2H_2Cl_2$cis and trans) in mole/hour and per liter of catalyst | | 1.10 | 0.87 | 0.93 |
| Feed molar ratios of the reactants | $C_2H_2Cl_2$cis/($C_2H_2Cl_2$cis + $C_2H_2Cl_2$trans) | 0.587 | 0.587 | 0.587 |
| | $C_2H_4$/($C_2H_4$+$C_2H_2Cl_2$cis + $C_2H_2Cl_2$ trans) | 0.81 | 0.62 | 0.44 |
| | HCl / ($C_2H_4$+$C_2H_2Cl_2$cis + $C_2H_2Cl_2$trans) | 2.10 | 2.02 | 2.03 |
| | $O_2$ / ($C_2H_4$+$C_2H_2Cl_2$cis + $C_2H_2Cl_2$trans) | 0.50 | 0.54 | 0.50 |
| Conversion rate of the mixture $C_2H_4$+ $C_2H_2Cl_2$ cis and trans in: | 1,2-dichloroethane | 76.0 | 58.3 | 41.2 |
| | 1,1,2-trichloroethane | 3.2 | 2.5 | 1.9 |
| | 1,1,2,2-tetrachloroethane | 15.3 | 31.6 | 48.6 |
| | ethylenic by-products | — | 0.4 | 0.9 |
| | $CO_2$ | 0.9 | 0.6 | 0.4 |
| | miscellaneous | 0.6 | 0.4 | 0.3 |
| | S | 95.9 | 95.8 | 96.2 |

By way of comparison, Example III was repeated twice, once with a feed mixture of ethylene and cis- and trans-dichloroethylenes having the molar ratio: $C_2H_4$ / ($C_2H_4$ + cis CHCl = CHCl + trans CHCl = CHCl) of 0.32 (test a) and the other with a molar ratio: $C_2H_4$ / ($C_2H_4$ + cis CHCl = CHCl + trans CHCl = CHCl) of 0.13 (test b). The results obtained are set forth in the following Table II:

TABLE II

| | | test a | test b |
|---|---|---|---|
| Conversion rate of the mixture of ethylene and of cis- and trans dichloroethylenes in molar % | 1,2-dichloroethane | 29.4 | 10.8 |
| | 1,1,2-trichloroethane | 1.9 | 1.8 |
| | 1,1,2,2-tetrachloroethane | 57.9 | 72.9 |
| | ethylenic by-products | 2.2 | 4.3 |
| | $CO_2$ | 0.4 | 0.4 |
| | Miscellaneous | 0.3 | 0.3 |
| S | | 94.6 | 92.6 |

It will be observed that in tests a) and b), wherein the feed molar ratio $C_2H_4 / (C_2H_4 + \text{cis-CHCl}=\text{CHCl} + \text{trans-CHCl}=\text{CHCl})$ is below the lower limit of 0.40 of this invention, the formation rate of ethylenic by-products becomes relatively significant and rises respectively to 2.2 and 4.3 molar per cent as compared to only 0.9 molar % in Example III. The main ethylenic by-product is trichloroethylene which forms an azeotrope with the 1,2-dichloroethane and is difficult to separate by distillation. The presence of this ethylenic by-product consequently constitutes a serious problem such that formation of excessive amounts of such ethylenic by-product should be avoided.

It will be apparent from the foregoing that we have provided a process whereby significant amounts of 1,1,2,2-tetrachloroethane along with 1,2-dichloroethane are obtained in sufficiently high yield and purity for separation by the process of oxychlorination of a mixture of ethylene and dichloroethylenes.

It will be understood that changes may be made in the details of formulation and operation without departing from the spirit of the invention, especially as defined in the following claims.

We claim:

1. A process for preparation of 1,2-dichloroethane and 1,1,2,2-tetrachloroethane containing less than 2 mole % chlorinated ethylenic derivatives by oxychlorination of ethylene and 1,2-dichloroethylene with a fluid bed catalyst comprising the steps of passing a gaseous mixture consisting essentially of molecular oxygen-containing gas, hydrochloric acid, ethylene and 1,2-dichloroethylenes, in which the ethylene makes up 40 to 95 molar % of the sum of the ethylene and dichloroethylenes and the ratio of HCl to the total of ethylene and dichloroethylenes is within the range of 1.6 to 2.4 and the ratio of oxygen to the total of ethylene and dichloroethylenes is within the range of 0.40 to 0.70, through a catalytic reaction zone at a temperature within the range of 200° to 360° C. with the catalytic reaction zone containing an oxychlorination catalyst deposited on a carrier having an average surface area within the range of 10–200 m²/q in a fluidized state.

2. The process as claimed in claim 1 in which the materials are passed through the catalytic reaction zone at a temperature within the range of 280° to 350° C.

3. The process as claimed in claim 1 in which the gaseous reactants are passed through the catalytic reaction zone at a feed rate based on the ethylene and dichloroethylenes within the range of 0.5 to 20 moles per hour per liter of catalyst.

4. The process as claimed in claim 1 in which the gaseous reactants are passed through the catalytic reaction zone at a feed rate based on the ethylene and dichloroethylnes within the range of 0.5 to 9.0 moles per hour per liter of catalyst.

5. The process as claimed in claim 1 in which the molar feed ratio of hydrochloric acid to the total of ethylene and dichloroethylenes is within the range of 1.8 to 2.2.

6. The process as claimed in claim 1 in which the molar feed ratio of oxygen to the total of ethylene and dichloroethylenes is within the range of 0.50 to 0.60.

7. The process as claimed in claim 1 in which the gaseous reactants are passed through the catalytic reaction zone at a feed rate, based upon the total of ethylene and dichloroethylenes, within the range of 0.5 to 20 moles per hour per liter of catalyst and in which the reactants are introduced in the molar feed ratio of hydrochloric acid to the sum of ethylene and dichloroethylenes within the range of 1.6 to 2.4 and oxygen to the sum of ethylene and dichloroethylenes within the range of 0.40 to 0.70.

8. The process as claimed in claim 1 in which the gaseous reactants are passed through the catalytic reaction zone at a temperature within the range of 280° to 350° C and in which the gaseous reactants are introduced at a feed rate, based upon the sum of ethylene and dichloroethylenes, within the range of 0.5 to 9.0 moles per hour per liter of catalyst and in which the ingredients are present in the molar ratio of HCl to the sum of ethylene and dichloroethylenes within the range of 1.8 to 2.2 and oxygen to the sum of ethylene and dichloroethylenes within the range of 0.50 to 0.60.

9. The process as claimed in claim 1 which includes the addition of at least one of the compounds selected from the group consisting of 1,2-dichloroethane and 1,1,2,2-tetrachloroethane and mixtures thereof to the gaseous feed introduced into the catalytic reaction zone in the molar ratio, based upon the sum of ethylene and dichloroethylenes in the feed, of less than 2.

10. The process as claimed in claim 1 in which the carrier is an attapulgite clay.

11. The process as claimed in claim 10 in which the attapulgite clay has an average specific surface area within the range of 10 to 160 m²/g.

12. The process as claimed in claim 1 in which the carrier consists of silica and magnesia.

13. The process as claimed in claim 12 in which the carrier of silica and magnesia has an average specific surface area within the range of 40 to 200 m²/g.

14. The process as claimed in claim 1 in which the carrier is of an average size within the range of 20 to 400 microns.

15. The process as claimed in claim 1 in which the oxychlorination reaction is carried out at a pressure within the range of 1 to 10 absolute bars.

* * * * *